US010095797B2

(12) United States Patent
Pola

(10) Patent No.: US 10,095,797 B2
(45) Date of Patent: Oct. 9, 2018

(54) SUGGESTING ACTIONS FOR EVALUATING USER PERFORMANCE IN AN ENTERPRISE SOCIAL NETWORK

(71) Applicant: salesforce.com, inc.

(72) Inventor: Peda Venkateswarlu Pola, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 131 days.

(21) Appl. No.: 14/506,480

(22) Filed: Oct. 3, 2014

(65) Prior Publication Data
US 2016/0098490 A1    Apr. 7, 2016

(51) Int. Cl.
G06F 17/30 (2006.01)
H04L 29/06 (2006.01)
G06Q 10/06 (2012.01)

(52) U.S. Cl.
CPC .. *G06F 17/30876* (2013.01); *G06F 17/30345* (2013.01); *G06Q 10/06398* (2013.01); *H04L 65/403* (2013.01)

(58) Field of Classification Search
CPC ................................. G06F 17/30876
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |

(Continued)

OTHER PUBLICATIONS

Merriam-Webster, "comment", 2016.*

(Continued)

*Primary Examiner* — O. C. Vostal
(74) *Attorney, Agent, or Firm* — Weaver Austin Villeneuve & Sampson LLP

(57) ABSTRACT

Disclosed are systems, methods, and computer program products for suggesting actions for evaluating user performance in an enterprise social network. In some implementations, a server of the enterprise social network identifies a message configured to be published to a feed of the enterprise social network. The message may comprise textual input received from a client machine associated with a first user of the enterprise social network. The server determines that the textual input comprises information evaluating a second user associated with the enterprise social network. The server provides data for display at the client machine, the data comprising a prompt to the first user to include the information related to the second user in a performance evaluation record for the second user.

20 Claims, 9 Drawing Sheets

(56) References Cited

U.S. PATENT DOCUMENTS

| | | | |
|---|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,006,881 B1 * | 2/2006 | Hoffberg ............... G05B 15/02 700/17 |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,580,848 B2 * | 8/2009 | Eder ...................... G06Q 10/06 705/35 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,865,511 B2 * | 1/2011 | Kahn ................... G06F 17/3089 707/758 |
| 7,945,653 B2 | 5/2011 | Zukerberg et al. |
| 7,966,369 B1 * | 6/2011 | Briere .................... G06Q 10/10 707/616 |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,046,313 B2 * | 10/2011 | Hoffberg ............... G06F 3/0482 706/14 |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,306,858 B2 * | 11/2012 | Lisbakken ......... G06Q 30/0275 705/14.71 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0174079 A1 * | 11/2002 | Mathias ................ G06F 17/15 706/12 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0061735 A1* | 3/2007 | Hoffberg ............... G06F 9/4443 715/744 |
| 2007/0288473 A1* | 12/2007 | Mukherjee ........ G06F 17/30873 |
| 2008/0005086 A1* | 1/2008 | Moore .............. G06F 17/30876 |
| 2008/0249972 A1 | 10/2008 | Dillon |
| 2008/0320055 A1* | 12/2008 | Sagar ................ G06F 17/30174 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2011/0282943 A1* | 11/2011 | Anderson .............. G06Q 10/06 709/204 |
| 2012/0042218 A1 | 2/2012 | Cinarkaya et al. |
| 2012/0179557 A1* | 7/2012 | Gross ..................... G06Q 30/02 705/14.73 |
| 2012/0179752 A1* | 7/2012 | Mosley .................. G06Q 10/10 709/204 |
| 2012/0233137 A1 | 9/2012 | Jakobson et al. |
| 2012/0290407 A1 | 11/2012 | Hubbard et al. |
| 2013/0024454 A1* | 1/2013 | Dunn ................ G06F 17/30997 707/740 |
| 2013/0073473 A1* | 3/2013 | Heath .................... G06Q 30/02 705/319 |
| 2013/0110775 A1* | 5/2013 | Forsythe ........... G06F 17/30943 707/613 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0310078 A1* | 10/2014 | Andriyanenko ....... G06Q 30/00 705/14.14 |
| 2014/0330669 A1* | 11/2014 | Bruce ................ G06Q 30/0631 705/26.7 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0033305 A1* | 1/2015 | Shear ..................... G06F 21/45 726/6 |
| 2015/0058417 A1* | 2/2015 | McConnell ........... H04L 67/306 709/204 |
| 2015/0081790 A1* | 3/2015 | Ogawa .............. G06F 17/30595 709/204 |
| 2015/0081797 A1* | 3/2015 | Ogawa .............. G06F 17/30595 709/205 |
| 2015/0095162 A1 | 4/2015 | Jakobson et al. |
| 2015/0127565 A1* | 5/2015 | Chevalier .............. G06Q 10/00 705/319 |
| 2015/0142596 A1 | 5/2015 | Jakobson et al. |
| 2015/0172563 A1 | 6/2015 | Jakobson et al. |
| 2015/0278367 A1* | 10/2015 | Chang ............... G06F 17/30867 707/723 |
| 2015/0302335 A1* | 10/2015 | Unda ............... G06Q 10/06393 705/7.39 |
| 2015/0324361 A1* | 11/2015 | Glass ................. G06Q 30/0256 707/748 |
| 2016/0012364 A1* | 1/2016 | Filgueiras ........ G06Q 10/06311 705/7.13 |

OTHER PUBLICATIONS

Merriam-Webster, "evaluate", 2016.*
Merriam-Webster, "intend", 2016.*
Merriam-Webster, "intent", 2016.*
Merriam-Webster, "performance", 2016.*
Merriam-Webster, "processor", 2017.*
Microsoft Computer Dictionary, "real-time", 5$^{th}$ edition, 2002, p. 441.*
"Google Plus Users", Google+Ripples, Oct. 31, 2011 [retrieved on Feb. 21, 2012 from Internet at http://www.googleplusers.com/google-ripples.html], 3 pages.

* cited by examiner

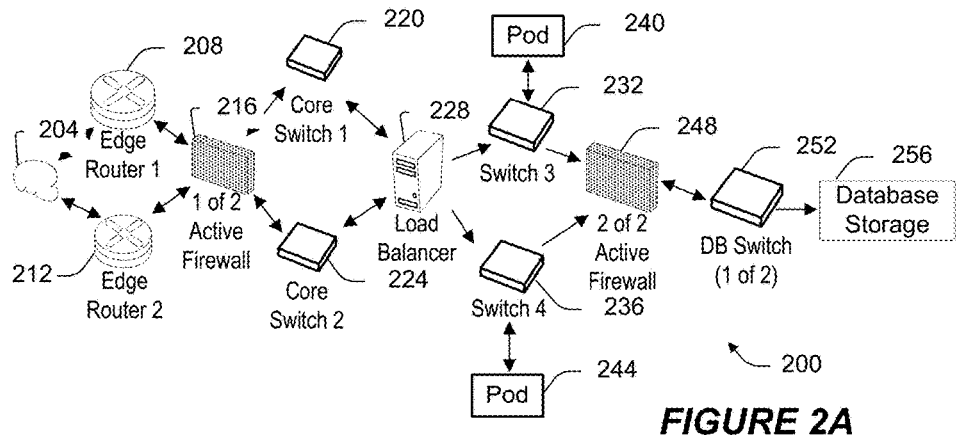
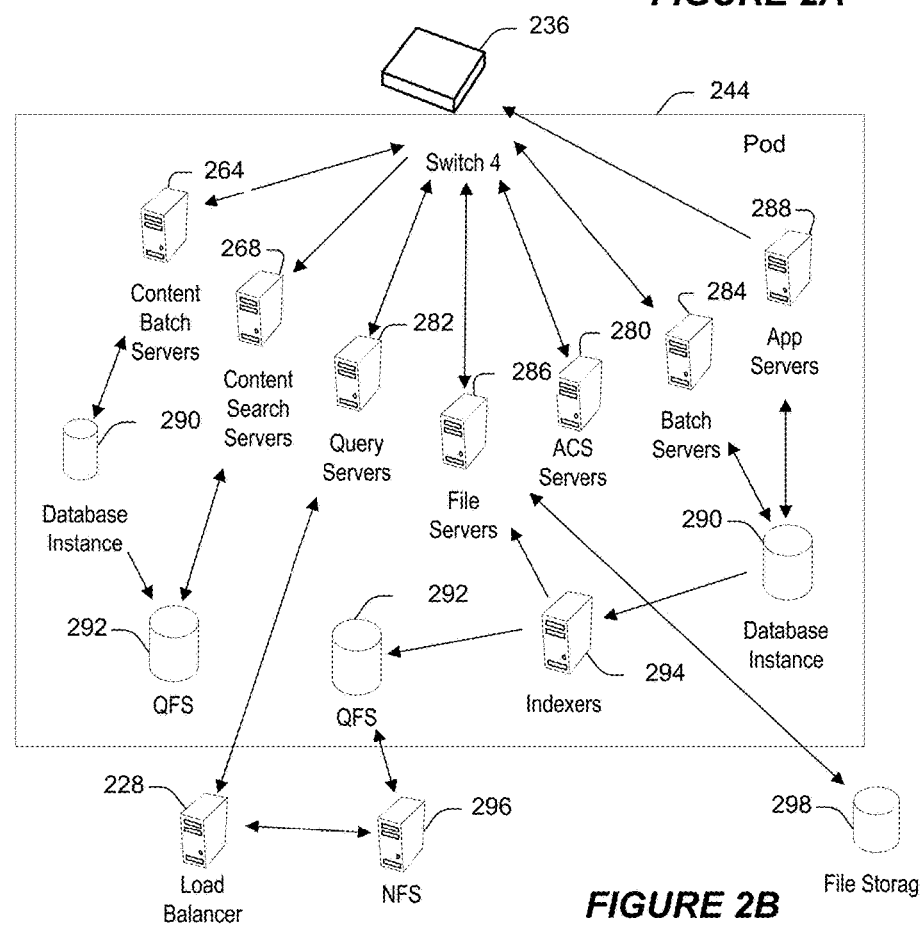

SUGGESTING ACTIONS FOR EVALUATING USER PERFORMANCE IN AN ENTERPRISE SOCIAL NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing services in an on-demand services environment using a database system and, more specifically, to techniques for identifying evaluative information in an information feed of a social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for suggesting actions for evaluating user performance in an enterprise social network. These drawings in no way limit any changes in form and detail that may be made by one skilled in the art without departing from the spirit and scope of the disclosed implementations.

FIG. 2A shows a system diagram illustrating an example of architectural components of an on-demand database service environment 200 according to some implementations.

FIG. 2B shows a system diagram further illustrating an example of architectural components of an on-demand database service environment according to some implementations.

FIG. 3 shows an example of a presentation of a social network feed in the form of a graphical user interface (GUI) as displayed on a computing device, in accordance with some implementations.

FIG. 4 shows an example of a social network feed in the form of a GUI as displayed on a computing device, in accordance with some implementations.

DETAILED DESCRIPTION

Figure 1A:
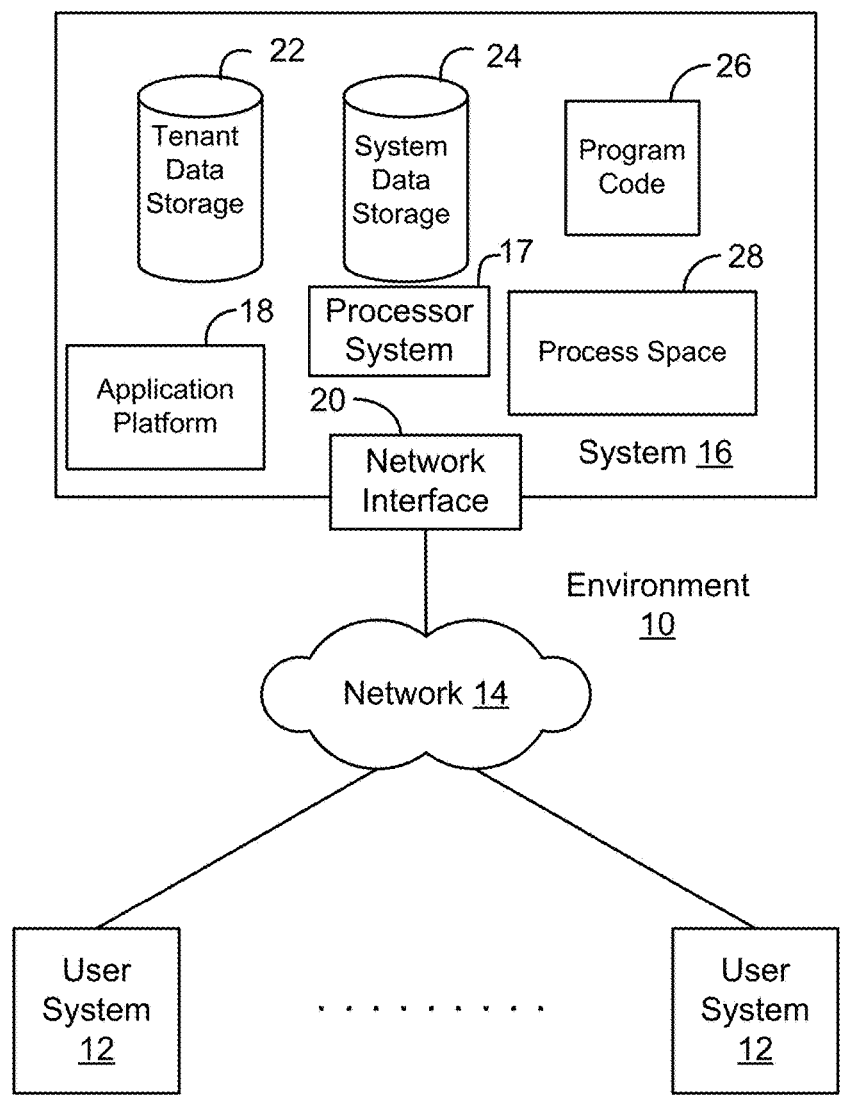
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, systems, and computer program products for suggesting actions for evaluating user performance in an enterprise social network, such as the non-limiting example of Chatter® provided by salesforce.com, inc. ("Salesforce").

In some implementations, a performance management platform, such as Salesforce's Work.com®, is also provided for tracking performance of employees and providing real-time recognition of their successes and contributions. Employees may use the platform to recognize colleagues with custom recognition awards such as badges, thanks, likes, bonuses, stickers, ratings, and the like, to create a positive work environment, motivate high performance, and increase employee morale. In some implementations, the recognition that employees receive via the platform may become part of their user profiles and performance summaries, allowing employers to measure employee performance and to identify and reward high-performing employees.

In some implementations, the enterprise social network and the performance management platform may be implemented in the same database system. In other implementations, they may be implemented in separate database systems. Users of the enterprise social network can be associated with corresponding accounts on the performance management platform.

As an example, in a sales context, a salesperson, Sam, who is an employee of an organization, may publish a status update to a feed that indicates progress in a sales opportunity. Another employee, Erin, may reply to the status update with a comment, such as "great work," or "good job," recognizing Sam for his accomplishment.

In this example, when Erin posts a message in the enterprise social network feed recognizing Sam for an accomplishment, the recognition is also recorded and attributed to Sam in the performance management platform. This may be desirable so that Sam's accomplishments may be officially recognized and incorporated into the performance measures that are compiled using the performance management platform. Otherwise, recognition in the social network might not be reflected in the performance management platform and taken into account for performance evaluation purposes.

In some implementations, the comments provided by Erin may or may not contain language indicating recognition of something that Sam has done. As an example, Erin, in her comment, may be merely providing additional information to help Sam solve the issue that he is working on, and the comment may contain no indication that Erin is recognizing Sam for an achievement. Various techniques disclosed herein may provide automatic detection of recognition based on the content of the comments. In this example, the recognition may be determined by identifying designated keywords, such as "great work," "amazing," "awesome," "good job," or similar words and phrases. One or more pattern recognition processes may also be utilized to determine whether a message includes recognition of someone's achievement.

When it is determined that Erin may be recognizing Sam for an accomplishment or achievement, Erin can be automatically prompted to create a performance recognition record in the performance management platform. As an example, Erin may be presented with the prompt: "It looks like you are recognizing Sam for an achievement. Would you like to add this as one of his achievements?" By responding to the prompt, Erin may cause Sam's status update to be included as an achievement for Sam on the performance management platform.

In some implementations, performance review reports may also be compiled for an employee based on the performance recognition records generated by various users with respect to the employee.

Some but not all of the techniques described or referenced herein are implemented as part of or in conjunction with a social networking system, also referred to herein as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, Customer Relationship Management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level.

Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
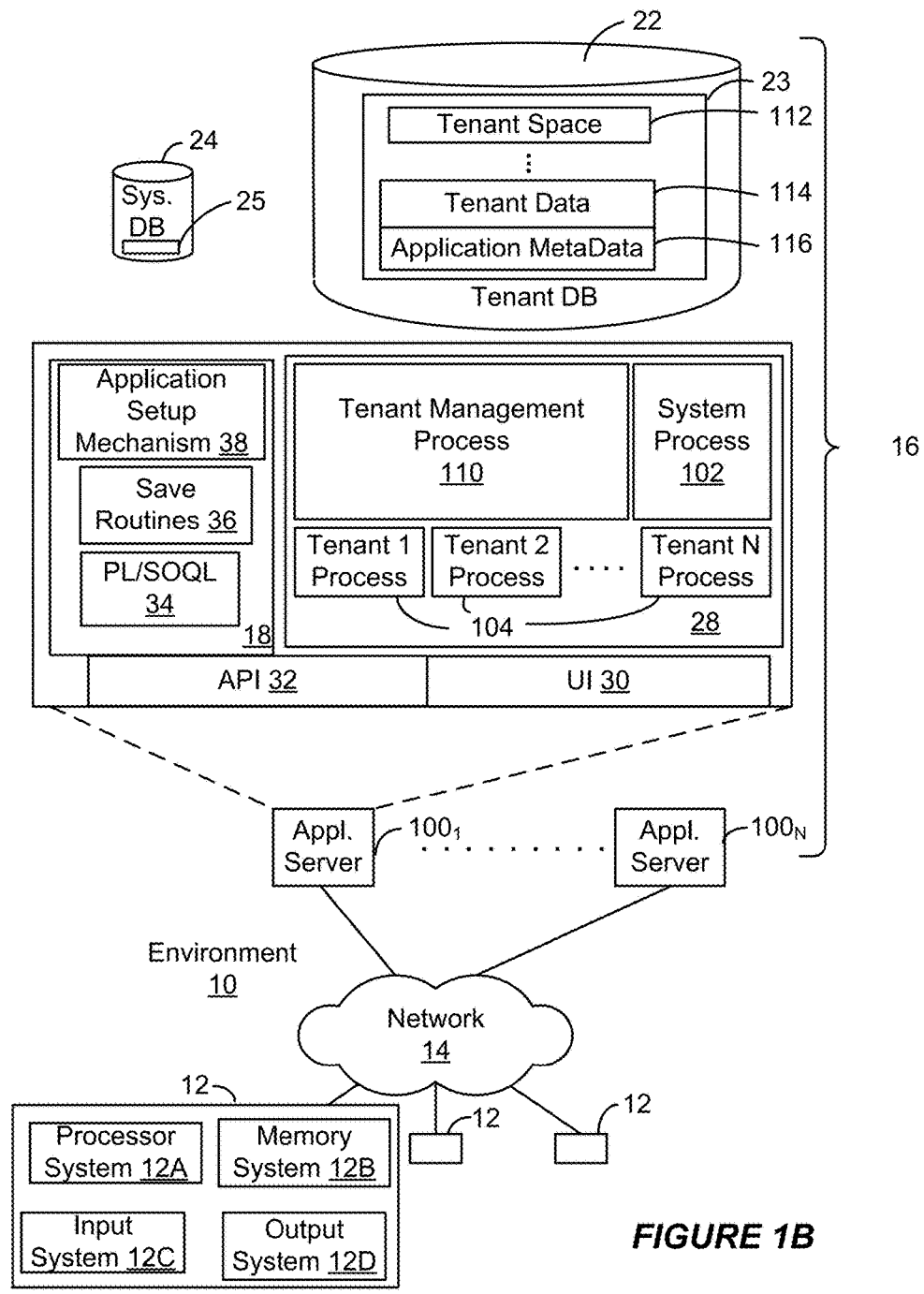
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 1C:
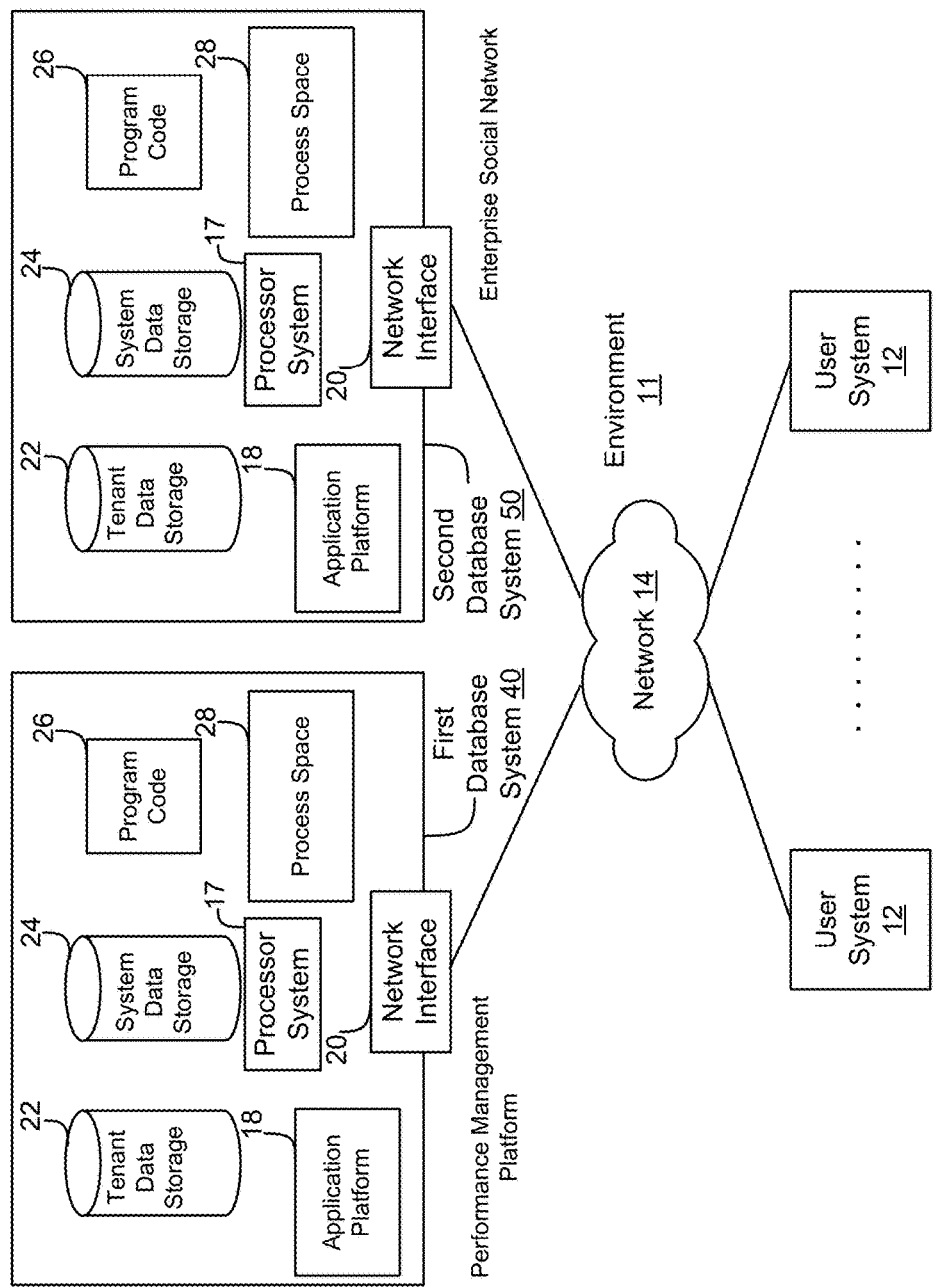
FIG. 1C shows a block diagram of an example of an environment 11 in which a performance management platform and an enterprise social network can be hosted, in accordance with some implementations.

FIG. 1C shows a block diagram of an example of an environment 11 in which a performance management platform and an enterprise social network can be hosted, in accordance with some implementations. Similar to the environment depicted in FIG. 1A, environment 11 includes user systems 12 and a network 14, as generally described in FIG. 1A. The environment 11 includes a first database system 40 that may host the performance management platform and a second database system 50 that may host the enterprise social network, in this example. The database systems 40 and 50 may each be implemented with components similar to the system 16 of FIG. 1A. The user systems 12 of the environment may communicate with the performance management platform hosted by the first database system 40 by, for example, logging into the performance management platform through a user interface of a web browser. The user systems 12 may likewise log in to the enterprise social network of the second database system 50 via a web browser. In some implementations, the enterprise social network may be configured to communicate with the performance management platform via the network 14 by using an application programming interface (API) provided by the performance management platform.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-13. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file servers 286 may manage requests for information stored in the file storage 298. The file storage 298 may store information such as documents, images, and basic large objects (BLOBs). By managing requests for information using the file servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file servers 286 and/or the QFS 292.

Figure 3:
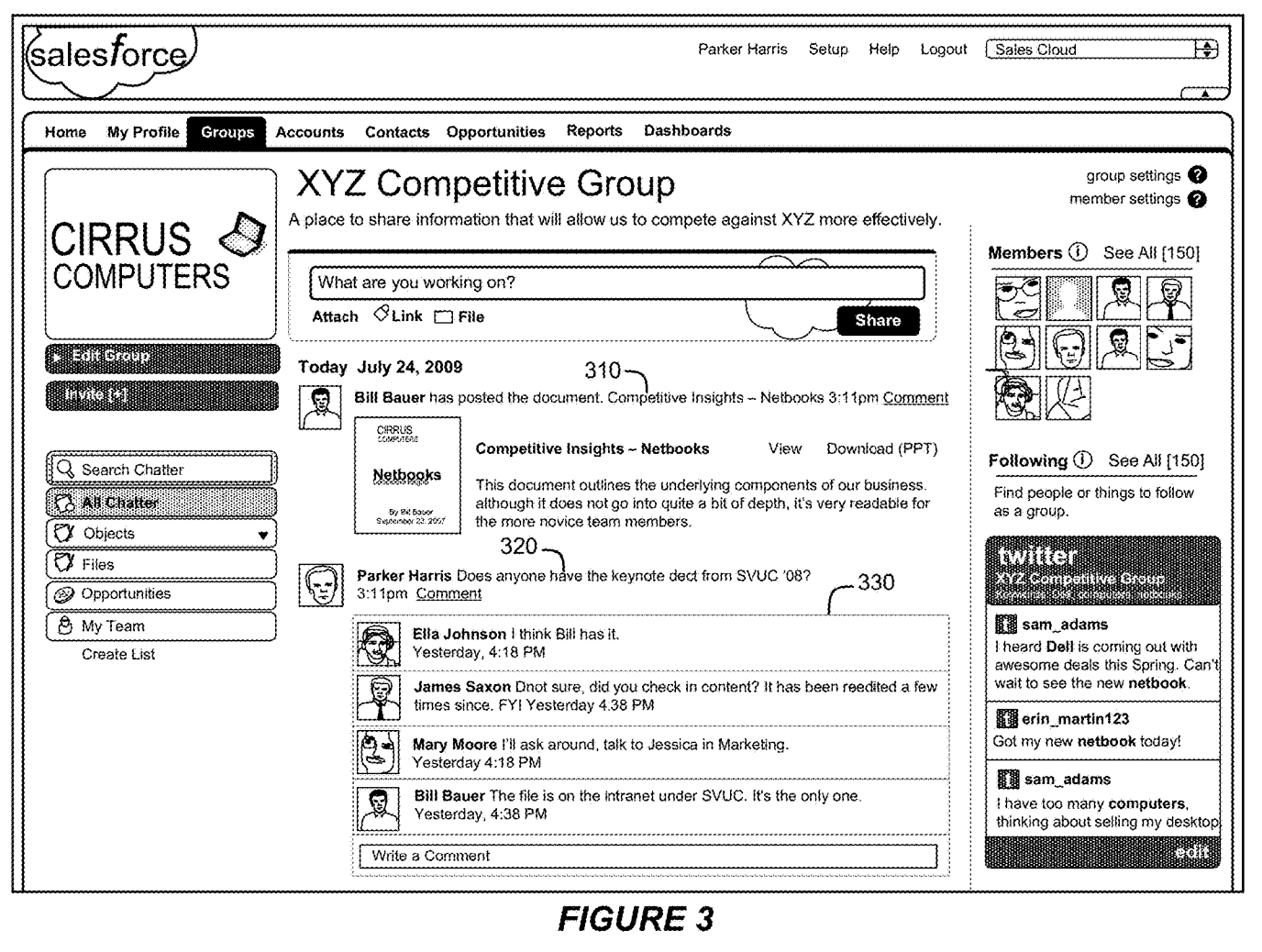

FIG. 3 shows an example of a presentation of a social network feed in the form of a graphical user interface (GUI) as displayed on a computing device, in accordance with some implementations. As shown, a feed item 310 shows that a user has posted a document to the group feed. The text "Bill Bauer has posted the document Competitive Insights" can be generated by the database system about a record being changed. A feed item 320 shows a post to the group, along with comments 330 from Ella Johnson, James Saxon, Mary Moore and Bill Bauer.

Figure 4:
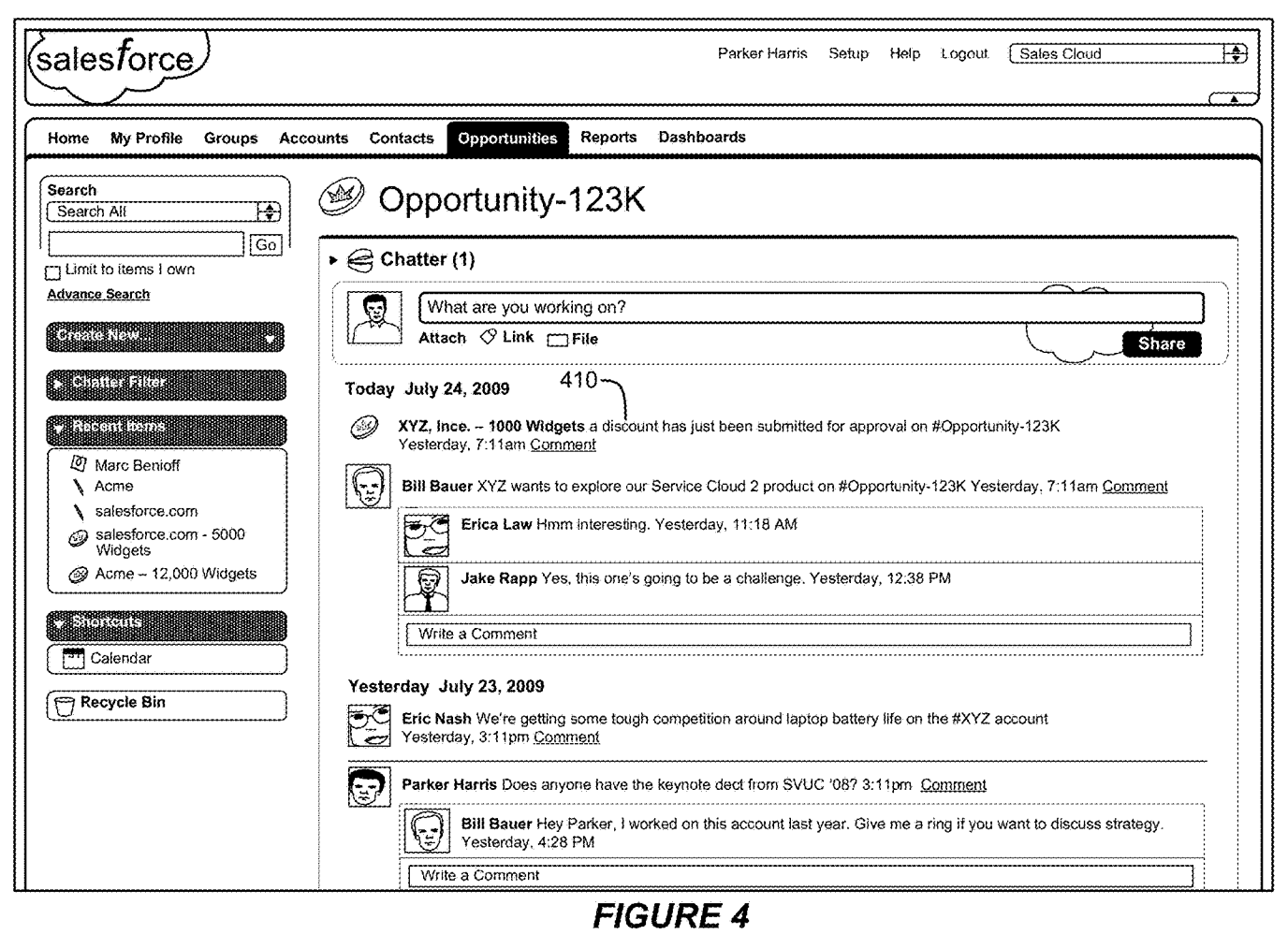

FIG. 4 shows an example of a social network feed in the form of a GUI as displayed on a computing device, in accordance with some implementations. In this example, the social network feed is in the form of a record feed on a record profile page for the "Opportunity-123K" record stored in a database system. The record feed includes a feed-tracked update, a post, and comments. Feed item 410 shows a feed-tracked update based on the event of submitting a discount for approval. Other feed items include posts, for example, from Bill Bauer, made to the record and comments, for example, from Erica Law and Jake Rapp, submitted in response to the posts.

Figure 5:
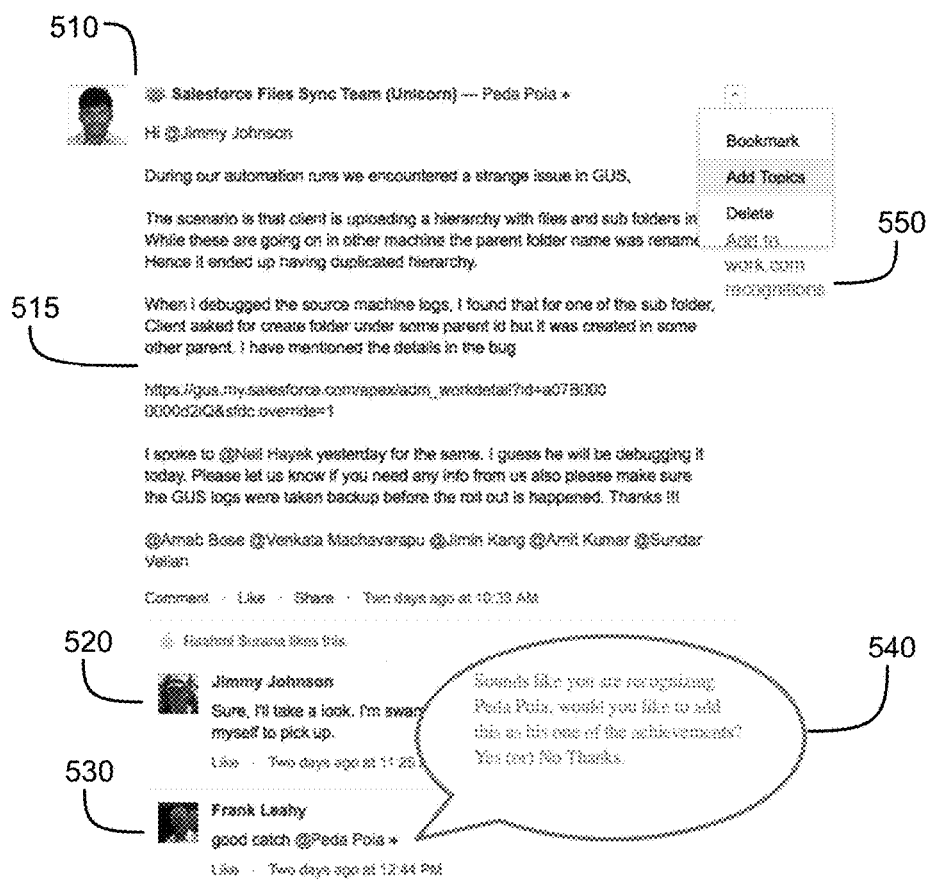
FIG. 5 shows an example of a feed item 510 including comments 520 and 530 to be published to one or more social network feeds, in accordance with some implementations.

FIG. 5 shows an example of a feed item 510 including comments 520 and 530 to be published to one or more social network feeds, in accordance with some implementations. FIG. 5 will be described further below within the context of FIG. 6.

Figure 6:
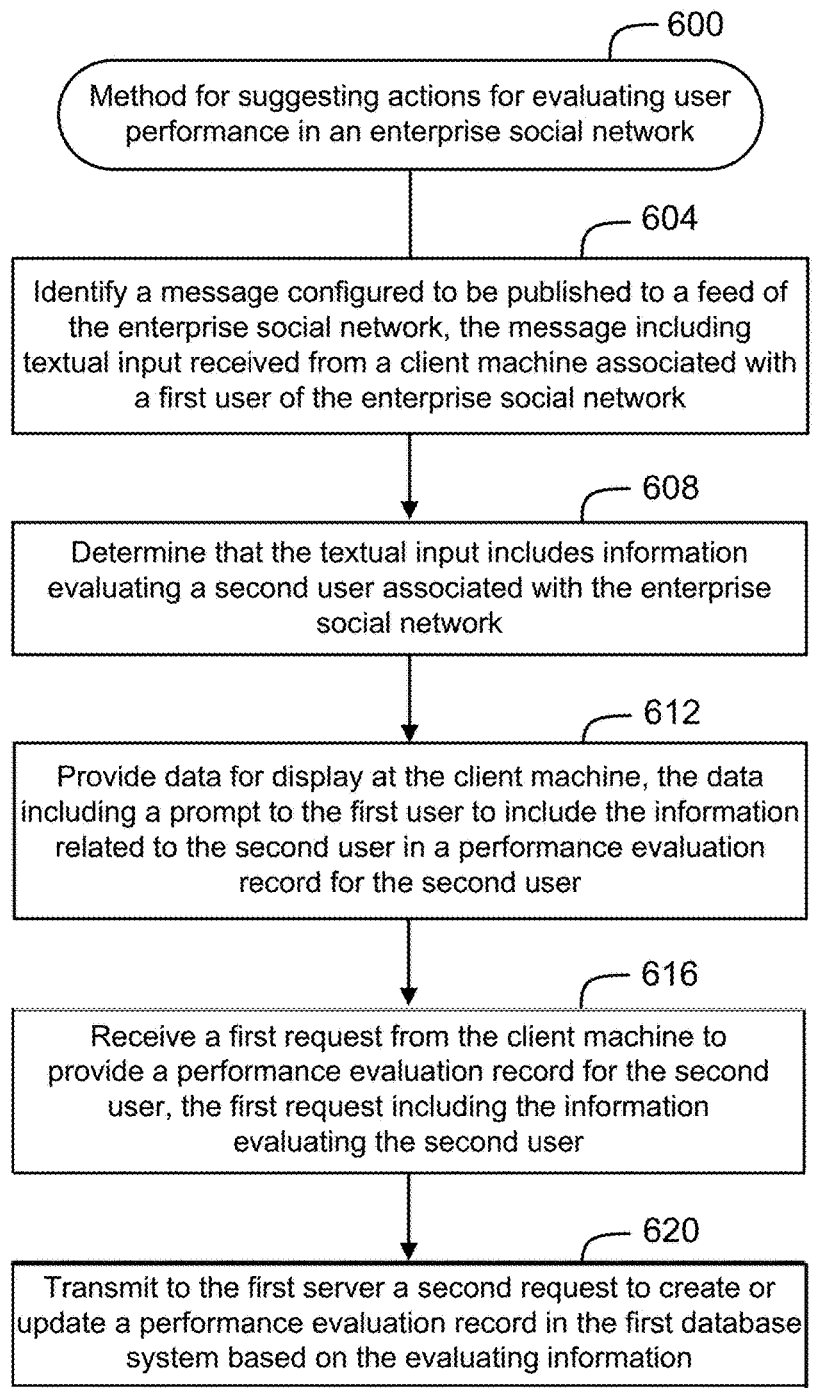
FIG. 6 shows a flowchart of an example of a computer implemented method 600 for suggesting actions for evaluating user performance in an enterprise social network, performed in accordance with some implementations.

FIG. 6 shows a flowchart of an example of a computer implemented method 600 for suggesting actions for evaluating user performance in an enterprise social network, performed in accordance with some implementations. In FIG. 6, at block 604, a server of an enterprise social network identifies a message configured to be published to a feed of the enterprise social network, such as a social media message in the form of a post to a social networking group or a comment in response to a post. The message may include textual input from a first user composing the message at a client machine. The first user may be logged into his user account of the enterprise social network while composing the message.

By way of illustration, in FIG. 5, Frank Leahy is logged into his enterprise social network user account and is viewing a feed item 510 including a post 515 published by Peda Pola describing a problem and Peda's work on the problem. Frank Leahy has submitted a comment 530 in response to the post 515 with the text "good catch @Peda Pola *". Another comment 520 from Jimmy Johnson on the post 515 precedes Frank Leahy's comment 530. Frank Leahy, Jimmy Johnson, and Peda Pola are employee users of Salesforce and are members of a group named "Files Sync Team". Peda Pola's initial post 515 was shared with the entire group.

In FIG. 6, at block 604, in some implementations, the message identified by the server does not include a request by the first user to evaluate the performance of the second user. In other words, the first user composing the message has not made a selection or otherwise indicated an affirmative intent to create a performance evaluation record when he publishes the message. The first user may have only intended to compose the message to communicate information to a group, to provide a status update, to provide instructions to another user, or even to praise the second user's achievements.

In FIG. 6, at block 608, the server of the enterprise social network determines that the textual input of the message includes information evaluating a second user associated with the enterprise social network. In some implementations, the server may parse the textual input and identify text that appears to be evaluating a second user. For example, returning to FIG. 5, Frank Leahy's comment 530 includes the text "good catch @Peda Pola *". The server receiving this message may parse the text of Frank Leahy's comment and identify the term "good catch" as potentially evaluative information for Peda Pola.

In some implementations, the server may make the determination that the textual input of a message includes information evaluating a second user by identifying one or more designated keywords in the textual input. For example, the server may determine whether the textual input includes keywords such as "good job," "good catch," "awesome," "great work," "amazing," and the like.

In some implementations, the server may determine that the textual input of the message includes evaluative information by using pattern recognition algorithms to determine the meaning of the textual input. The pattern recognition algorithms may include one or more rules for determining when a text contains evaluative information. An example of such a rule may specify that if a text includes a reference to another user, such as "@Peda Pola", and contains the keyword "good", then it is determined that the textual input contains evaluative information for the user Peda Pola. As another example, a rule may utilize regular expression matching to determine that a textual input includes evaluative information. Another example of a rule may determine that textual input includes evaluative information when evaluative keywords, such as "good", "awesome", "great" comprise at least, say, 10% of the textual input.

In some implementations, the second user may be associated with a user account within the performance management platform and a user account within the enterprise social network. For example, returning to FIG. 5, the user Peda Pola may have an account in the performance management platform and an account in the enterprise social network, and the two accounts may be associated with one another, such that evaluative information received for Peda Pola's enterprise social network user account may be associated with Peda Pola's performance management platform user account.

In some other implementations, the performance management platform and the enterprise social network may be operated by the same service provider or hosted by the same database system. For example, Chatter® provides an enterprise social network that may integrate with Work.com®, which hosts a performance management platform in which users of Work.com® are associated with performance recognition records for their work. In this implementation, when Frank Leahy publishes a comment pertaining to Peda Pola on Chatter®, the contents of the comment may be sent to Work.com® to be included in a performance recognition record for Peda Pola.

In other implementations, the performance management platform and the enterprise social network may be operated by different service providers or hosted by different database systems. As an example, Salesforce Chatter® could include performance management features that allow users of Chatter® to create performance evaluation records for other users directly within Chatter®.

In FIG. 6, at block 612, the server of the enterprise social network provides data to the client machine for display at the client machine. The data may include a prompt to the first user to include the evaluative information for the second user in a performance evaluation record for the second user in the performance management platform. As an example, returning to FIG. 5, in response to Frank Leahy posting the comment "good catch @Peda Pola *", the user interface displays a prompt 540 stating: "Sounds like you are recognizing Peda Pola, would you like to add this as one of his achievements? Yes (or) No Thanks." Once the server of the enterprise social network recognizes Frank Leahy's textual input as potentially containing evaluative information for Peda Pola, the server provides this prompt to remind Frank Leahy to create a performance evaluation record if the user is intending to recognize Peda Pola in this comment of the enterprise social network.

In some implementations, the prompt may be a suggestion to Frank Leahy to create a performance evaluation record in the performance management platform. In another implementation, the performance management platform could be automatically generated in response to the published comment.

In some implementations, the prompt may appear as it does in FIG. 5, superimposed over the feed item. Alternatively, the prompt may appear in a separate window, in a separate tab, in a superimposed lightbox, or in a sidebar of the user interface.

In some implementations, the prompt may be persistently displayed in the user interface of the enterprise social network, such that the contents of any feed item may be included in a performance management record. In other words, rather than appearing when a feed item contains potentially evaluative information, the prompt may appear as an option in a sidebar, which the user may select at any time to create a performance management record based on the displayed feed item. In FIG. 5, the "Add to work.com recognitions" option 550 in the sidebar allows a user to include the contents of any feed item in a Work.com® recognition record. In another implementation, the option 550 may appear when the server of the enterprise social network determines that the feed item contains potentially evaluative information, rather than displaying the prompt 540 superimposed on the feed item. In yet another implementation, the option 550 may be persistently displayed and the prompt 540 may be displayed when the feed item contains evaluative information.

In FIG. 6, at block 616, the server of the enterprise social network receives a first request from the client machine in response to the prompt displayed at the client machine. The first request may be a request to create or provide a performance evaluation record for the second user as prompted, and the first request may include the information from the textual input evaluating the second user. As an example, returning to FIG. 5, Frank Leahy may select "Yes" in response to the prompt 540 or select the "Add to work.com recognitions" option 550. In response to Frank Leahy's selection, the client machine may generate a request to be transmitted to the enterprise social network. This request may include a request to create a performance evaluation record for Peda Pola in Work.com®, and the request may include the evaluative information provided by Frank Leahy: "good catch @Peda Pola *."

In some implementations, the first request may also include contextual information from the feed related to the evaluative information. The contextual information may include the feed item that the evaluative information was a part of, any comments associated with the feed item, any files attached to the feed item, any tasks related to the feed item, or any information from other related feed items. For example, in FIG. 5, the request back to the server may also include the information displayed in feed item 510, which may include Peda Pola's initial post and the associated comments.

In FIG. 6, at block 620, the server of the enterprise social network transmits to the first server a second request to create or update a performance evaluation record in the database system hosting the performance management platform. The performance evaluation record may be created or updated based on the evaluative information provided by the first user in the enterprise social network.

In the example of FIG. 5, the Chatter® server may then transmit a request to a Work.com® server to create a Work.com® recognition record for Peda Pola based on Frank Leahy's comment and any other contextual information for the comment. Work.com® may include a published set of API's that allows applications like Chatter® to cause recognition records to be created within Work.com® for designated users. Peda Pola's Chatter® account may be associated with his Work.com® account, so that the server of the enterprise social network may determine which Work.com® account should be associated with the new or updated recognition record. In the example where Chatter® and Work.com® are hosted within the same database system, this request may be handled internally within the database system.

Figure 7:
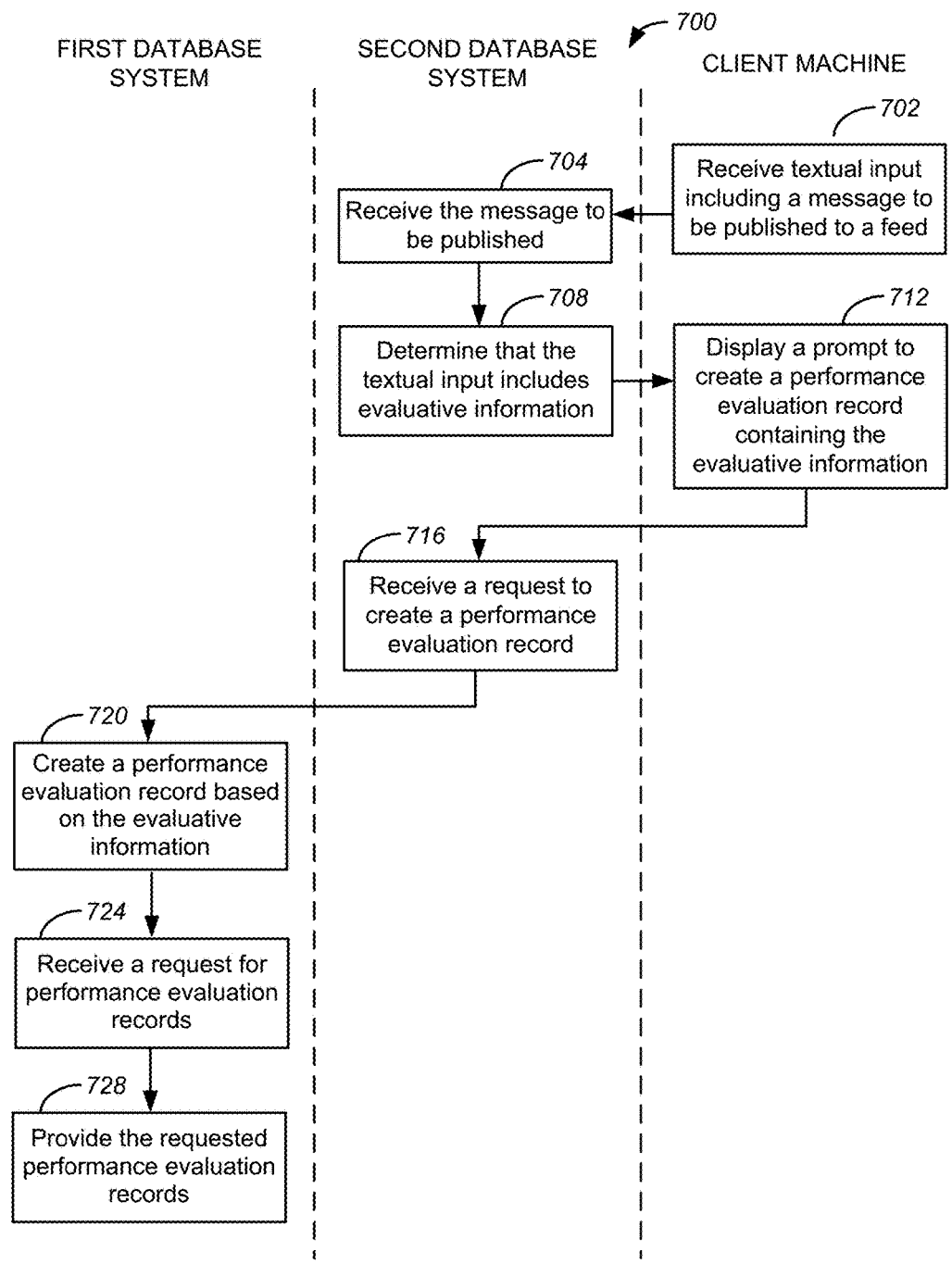
FIG. 7 shows a flowchart of an example of a computer implemented method 700 for suggesting actions for evaluating user performance in an enterprise social network, performed in accordance with some implementations.

FIG. 7 shows a flowchart of an example of a computer implemented method 700 for suggesting actions for evaluating user performance in an enterprise social network, performed in accordance with some implementations.

In FIG. 7, at block 702, a client machine in communication with a first database system and a second database system receives textual input including a message to be published to a feed. As an example, a user of the enterprise social network may have composed a post or a comment and requested that it be published.

In FIG. 7, at block 704, the second database system hosting an enterprise social network receives the message to published in a feed of the enterprise social network, as generally described in block 604 of FIG. 6. In FIG. 7, at block 708, the second database system determines that the textual input includes evaluative information, as generally described in block 608 of FIG. 6. In FIG. 7, at block 712, the client machine displays a prompt to create a performance evaluation record containing the evaluative information, as generally described in block 612 of FIG. 6. In FIG. 7, at block 716, the second database system receives a request from the client machine to create a performance evaluation record, as generally described in block 616 of FIG. 6. In FIG. 7, at block 720, the first database system hosting a performance management platform creates a performance evaluation record based on the evaluative information provided by the first user in the received textual input, as generally described in block 620 of FIG. 6.

In FIG. 7, at block 724, the first database system receives a request for performance evaluation records associated with the second user. Returning to the example of FIG. 5, after the performance evaluation record has been created for Peda Pola within the Work.com® system, Peda Pola's supervisor may login to Work.com® and submit a request for all of Peda Pola's performance evaluation records. The Work.com® system may provide a mechanism for generating a performance review report for Peda Pola. The report may be a quarterly report or a yearly report, or it may be generated with any range of dates as requested by the user.

In FIG. 7, at block 728, the first database system provides the requested performance evaluation records. In the example of FIG. 5, the performance review report generated by the Work.com® system may include the performance evaluation records generated by various users for Peda Pola, including the record generated by Frank Leahy in response to the comment 530 he posted in Chatter®.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2®, by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for suggesting actions for evaluating user performance in an enterprise social network, the system comprising:
    a database system implemented using a server system, the database system configurable to cause:
        processing textual input of a social media message submitted by a client machine associated with a first one of a plurality of users of an enterprise social networking system associated with the database system, the processing of the textual input comprising:
            parsing the textual input to detect satisfaction of criteria comprising:
                the textual input comprises data designated as indicating an evaluation of performance of a user of the enterprise social networking system, the designated data maintained using one or more designated data objects stored in a database, and
                the textual input comprises a reference to a second one of the users of the enterprise social networking system;
        displaying, responsive to detecting satisfaction of the criteria, a prompt at a display of the client machine, the prompt requesting the first user to submit evaluative information for the second user;
        generating or updating, responsive to receiving the evaluative information in association with the prompt, a performance evaluation record to store the evaluative information in association with the second user, the performance evaluation record maintained using one or more record data objects stored in a database; and
        sharing, in real-time, an identification of the evaluative information in a feed item of a feed of the enterprise social networking system.

2. The system of claim 1, the database system further configurable to cause:
    processing a first request from the client machine to provide a performance evaluation for the second user.

3. The system of claim 2, wherein the first request identifies contextual information from the feed related to the evaluative information, and wherein the performance evaluation record is generated or updated to further store the contextual information.

4. The system of claim 3, wherein the social media message is a comment regarding a post of the feed, and wherein the contextual information comprises feed item information of the post or of one or more further comments regarding the post.

5. The system of claim 1, wherein the second user is associated with a corresponding user account in a performance management platform, and wherein the performance evaluation record is associated with the corresponding user account.

6. The system of claim 1, wherein the designated data comprises one or more designated keywords.

7. The system of claim 1, wherein determining that the textual input comprises the designated data comprises discerning a meaning of the textual input using pattern recognition.

8. The system of claim 1, wherein the social media message does not comprise a request by the first user to evaluate the performance of the second user.

9. The system of claim 8, wherein the social media message is a comment regarding a post of the feed, the post comprising a status update attributed to the second user.

10. The system of claim 5, wherein the performance management platform and the enterprise social networking system are both provided by the same service provider.

11. The system of claim 1, wherein the criteria further comprises: at least a threshold amount of the textual input consists of the designated data.

12. The system of claim 1, the database system further configurable to cause:
    processing a request for performance evaluation records associated with the second user; and
    providing the performance evaluation records associated with the second user, the performance evaluation records comprising the generated or updated performance evaluation record.

13. A computer implemented method for suggesting actions for evaluating user performance in an enterprise social network, the method comprising:
    processing textual input of a social media message submitted by a client machine associated with a first one of a plurality of users of an enterprise social networking system associated with a database system, the processing of the textual input comprising:
        parsing the textual input to detect satisfaction of criteria comprising:
            the textual input comprises data designated as indicating an evaluation of performance of a user of the enterprise social networking system, the designated data maintained using one or more designated data objects stored in a database, and
            the textual input comprises a reference to a second one of the users of the enterprise social networking system;
    causing, responsive to detecting satisfaction of the criteria, displaying of a prompt at a display of the client machine, the prompt requesting the first user to submit evaluative information for the second user;
    causing, responsive to receiving the evaluative information in association with the prompt, generating or updating of a performance evaluation record to store the evaluative information in association with the second user, the performance evaluation record maintained using one or more record data objects stored in a database; and
    causing, in real-time, sharing of an identification of the evaluative information in a feed item of a feed of the enterprise social networking system.

14. The method of claim 13, the method further comprising:
    processing a first request from the client machine to provide a performance evaluation.

15. The method of claim 14, wherein the first request identifies contextual information from the feed related to the evaluative information, and wherein the performance evaluation record is generated or updated to further store the contextual information.

16. The method of claim 13, wherein the social media message does not comprise a request by the first user to evaluate the performance of the second user.

17. A computer program product comprising computer-readable program code to be executed by one or more processors when retrieved from a non-transitory computer-readable medium, the program code comprising instructions configured to cause:

processing textual input of a social media message submitted by a client machine associated with a first one of a plurality of users of an enterprise social networking system associated with a database system, the processing of the textual input comprising:

parsing the textual input to detect satisfaction of criteria comprising:

the textual input comprises data designated as indicating an evaluation of performance of a user of the enterprise social networking system, the designated data maintained using one or more designated data objects stored in a database, and the textual input comprises a reference to a second one of the users of the enterprise social networking system;

displaying, responsive to detecting satisfaction of the criteria, a prompt at a display of the client machine, the prompt requesting the first user to submit evaluative information for the second user;

generating or updating, responsive to receiving the evaluative information in association with the prompt, a performance evaluation record to store the evaluative information in association with the second user, the performance evaluation record maintained using one or more record data objects stored in a database; and sharing, in real-time, an identification of the evaluative information in a feed item of a feed of the enterprise social networking system.

18. The computer program product of claim 17, the instructions further configured to cause:

processing a first request from the client machine to provide a performance evaluation.

19. The computer program product of claim 18, wherein the first request identifies contextual information from the feed related to the evaluative information, and wherein the performance evaluation record is generated or updated to further store the contextual information.

20. The computer program product of claim 17, wherein the social media message does not comprise a request by the first user to evaluate the performance of the second user.

* * * * *